3,179,510
DEFOLIATION OF COTTON
Robert F. Husted, Florissant, Mo., assignor to Monsanto Company, a corporation of Delaware
No Drawing. Filed Oct. 1, 1962, Ser. No. 227,587
12 Claims. (Cl. 71—2.7)

This invention relates to defoliation of plants without damage to the crops and without interfering with the continued growth and development of the plant. More specifically, the invention provides a convenient and efficient procedure for removing the leaves from cotton plants.

In harvesting cotton by mechanical equipment, the leaves interfere with the proper operation of the machine. Furthermore, the harvesting operation frequently crushes the leaves and the cotton may become discolored. Defoliation of the cotton plants enables a complete harvesting of the cotton free of stains and leaves, thereby facilitating the finishing operations.

Defoliation is not a herbicidal action, and the killing of the plant is not desirable. With the death of the plants, the leaves adhere to the twigs and the beneficial effect on the harvesting operations is not attained. In the defoliation it is necessary that the plant remain alive so that the complete development of the boll takes place. It is known that certain substances induce the abnormal growth of the abscision cells at the base of the petioles, which causes the cell layers to separate. This same mechanism is involved in the dropping of leaves by decidous plants at the beginning of the dormant season.

Not all agents which have a defoliation effect are suitable. Some herbicidal compounds cause leaf fall as an incipient herbicidal effect and the ultimate destruction of the plant may take place before the crops have matured. Other defoliants stain the cotton or produce other deleterious effects on the crops.

The present invention utilizes antimetabolic activity to effect defoliation. Aminoacids either free or present as protein components have nutrient properties and are absorbed into the plant fluids and are ultimately assimilated by the plant tissues through the action of plant enzymes. Methionine is one of the essential aminoacids, without which the plant suffers the effects of malnutrition. Antimetabolites of methionine, compounds which have similar structure but which have an unnatural component, cannot be assimilated by the plant but do react with the enzymes and minimize their abilities to function in the normal manner. This does not produce a herbicidal reaction since the plants can provide to some extent their methionine requirements.

A large number of antimetabolites of methionine have been studied especially with respect to their effects on living plants. Most of these compounds do not seriously affect the plants, but are in many instances beneficial in destroying parasitic organisms such as insects, bacteria and fungi, which are unable to produce methionine. It has now been found that dl-methionine sufoximine and derivatives, antimetabolites of methionine of the structure

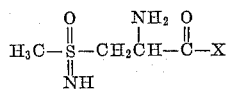

wherein —X is selected from the group consisting of —OH, —NH$_2$, —ONH$_4$, ONa, OK and $$\frac{OCa}{2}$$

have the ability to defoliate cotton plants. This appears to be a specialized antimetabolic action, but one which other antimetabolites do not induce. For example, the hydroxyanalogue of methionine with hydroxy in place of amino is the full equivalent of methionine in its nutrient properties, but the sulfoximine of the hydroxy analogue does not have any defoliation activity.

Example 1

Six week old cotton plants and also mature plants with opened bolls were sprayed with 0.5% solutions of each of the following compounds:

2-amino-4-(ethylthio)butyric acid
Dl 4(ethylthio)-2-hydroxybutyramide
Dl α-amino-4(methylsulfinyl)butyric acid
Dl 2-hydroxy-4(ethylthio)butyric acid
Dl 2-amino-4(ethylsulfonyl)butyric acid
2-amino-4-(ethylsulfinyl)butyric acid
2-amino-4-(methylsulfonyl)butyric acid (methionine sulfone)

In each little or no defoliation was effected on either age plants.

Example 2

Both young and mature cotton plants were sprayed with solutions of dl-methioninesulfoximine of various concentrations. The following table sets forth the observed effect and includes application rates by concentrations and pounds per acre when applied to the saturation (drip point) level.

| Percent Concentration | Pounds per Acre | Percent Defoliation |
| --- | --- | --- |
| 0.10 | 2.0 | 90 to 100 |
| 0.05 | 1.0 | 90 to 100 |
| 0.02 | 0.4 | 75 |

Very similar defoliation effects were obtained on both groups of plants.

Example 3

The procedure of Example 2 was repeated using the hydroxy analogue of methionine sulfoxamine, 2-hydroxy-4-(methylsulfoximino)butyric acid. No defoliation was observed at all concentrations.

The defoliation procedure may be practiced with aqueous solutions of the methionine sulfoximine, but frequently more efficient procedures result from the use of formulations.

The compounds may be applied to the leaves as solid powders and for this use solid diluents may be used, such as pulverulent materials which include the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 90 percent by weight of the formulation applied to the plant. Here again the precise proportion to be used will depend upon the quantity of active component which will be retained on the leaf surface so as to provide an amount which will produce the optimum result. It has been found that the formulation must be such as to leave in contact with the leaf surface the quantity of active defoliant ingredient required to produce the extent of defoilation required or desired. The use of formulations including solids enables the visual evaluation of the extent of coverage. The presence of extraneous solids frequently affects the longevity of contact.

Conditioning agents which may advantageously be included are the wetting, dispersing and other surface active agents. These include conventional soaps, such as the water-soluble salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the plant surfaces.

Either the solid or the liquid formulations may include small quantities of natural or artificial polymers which may become viscous with the evaporation of the formulation of the vehicle or which in the case of solid compositions may become viscous liquids by hygroscopic action or by partial solution in water subsequently sprayed on the surface or by natural rainfall. Suitable agents of this type are the natural gums, for example gum arabic, gum tragacanth or gum acacia or they may be synthetic polymers such as carboxymethyl cellulose, alginic acid or salts, polyvinyl alcohol or the wholly synthetic polymers such as hydrolyzed polyacrylonitrile and polymers of vinyl acetate and maleic anhydride or any of the other well known polymeric polyelectrolytes.

Although the invention is described with respect to specific modifications, the details thereof are not intended to be limitations on the scope of the invention except to the extent incorporated in the following claims.

The embodiments of the invention in which an exclusive property or privilege is claimed are defined as follows:

1. The method of defoliating cotton which comprises contacting the leaves of the cotton plant with an effective amount of a compound of the structure $$CH_3-\underset{\underset{NH}{\|}}{\overset{\overset{O}{\|}}{S}}-CH_2-CH_2CH-\overset{NH_2}{\underset{}{C}}-\overset{O}{\underset{}{\|}}-X$$

wherein X is selected from the group consisting of —NH₂, —OH, —ONH₄, O—Na, OK and $$\frac{OCa}{2}$$

2. The method of defoliating cotton which comprises contacting the leaves of the cotton plant with an effective amount of a compound of the structure

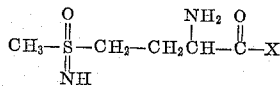

3. The method of defoliating cotton which comprises contacting the leaves of the cotton plant with an effective amount of a compound of the structure

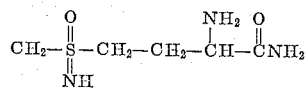

4. The method of defoliating cotton which comprises contacting the leaves of the cotton plant with an effective amount of a compound of the structure

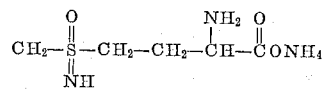

5. The method of defoliating cotton which comprises contacting the leaves of the cotton plant with an effective amount of a compound of the structure

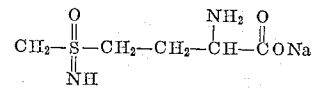

6. The method of defoliating cotton which comprises contacting the leaves of the cotton plant with an effective amount of a compound of the structure

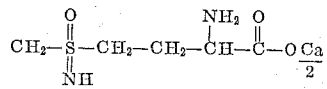

7. The method of defoliating cotton which comprises contacting the leaves with 0.5 to 10 pounds per acre of a compound of the structure

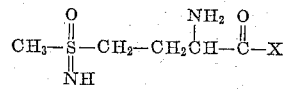

wherein X is selected from the group consisting of —NH₂, —OH, —ONH₄, O—Na, OK and $$\frac{OCa}{2}$$

8. The method of defoliating cotton which comprises contacting the leaves with 0.5 to 10 pounds per acre of a compound ow the structure

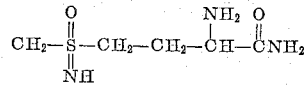

9. The method of defoliating cotton which comprises contacting the leaves with 0.5 to 10 pounds per acre of a compound of the structure

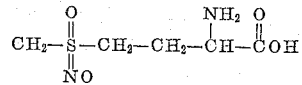

10. The method of defoliating cotton which comprises contacting the leaves with 0.5 to 10 pounds per acre of a compound of the structure

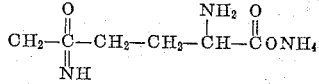

11. The method of defoliating cotton which comprises contacting the leaves with 0.5 to 10 pounds per acre of a compound of the structure

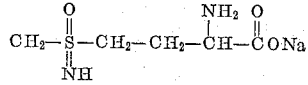

12. The method of defoliating cotton which comprises contacting the leaves with 0.5 to 10 pounds per acre of a compound of the structure

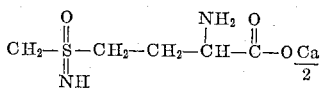

References Cited in the file of this patent

Braun: Chemical Abstracts, vol. 45, cols. 1208(i) to 1209(b), 1951.

Kolusek et al.: Chemical Abstracts, vol. 53, col. 1523(a) (1959).

UNITED STATES PATENT OFFICE
CERTIFICATE OF CORRECTION

April 20, 1965

Patent No. 3,179,510

Robert F. Husted

It is hereby certified that error appears in the above numbered patent requiring correction and that the said Letters Patent should read as corrected below.

Column 4, lines 43 to 47, the structural formula should appear as shown below instead of as in the patent:

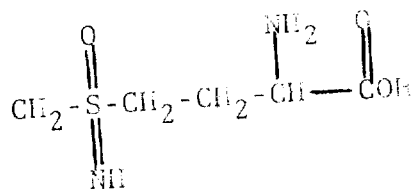

Signed and sealed this 26th day of October 1965.

(SEAL)
Attest:

ERNEST W. SWIDER
Attesting Officer

EDWARD J. BRENNER
Commissioner of Patents